Figure 1:
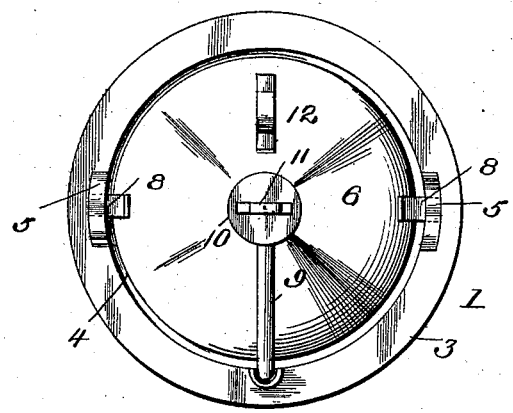

(No Model.)

J. E. EPP.
CULINARY UTENSIL.

No. 539,861. Patented May 28, 1895.

Witnesses

Inventor
John E. Epp.
By H. A. Wilson.
Attorney

United States Patent Office.

JOHN E. EPP, OF SAYRE, PENNSYLVANIA.

CULINARY UTENSIL.

SPECIFICATION forming part of Letters Patent No. 539,861, dated May 28, 1895.

Application filed August 29, 1894. Serial No. 521,652. (No model.)

*To all whom it may concern:*

Be it known that I, JOHN E. EPP, a citizen of the United States, residing at Sayre, in the county of Bradford and State of Pennsylvania, have invented certain new and useful Improvements in Culinary Utensils; and I do declare the following to be a full, clear, and exact description of the invention, such as will enable others skilled in the art to which it appertains to make and use the same.

My invention has relation to culinary utensils, and it relates more particularly to covers or lids adapted for use with ordinary frying pans for the primary purpose of preventing the spattering of grease, &c., over and upon the stove and the escape of steam and smoke into the atmosphere and for the further purpose of enabling the contents of the frying pan to be more quickly cooked and richly browned, and with the above and other objects in view, the invention consists in the novel construction, arrangement and combination of parts constituting my improved lid or cover, as hereinafter fully described, illustrated in the drawings and set forth in the appended claim.

Figure 2:
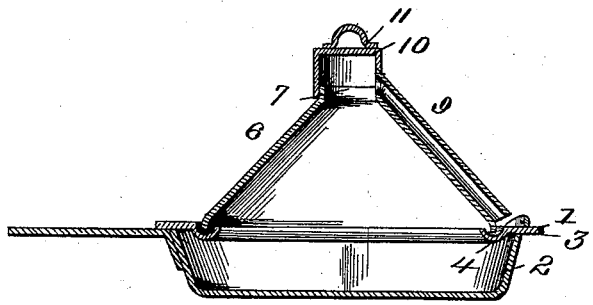

In the drawings, Figure 1 is a plan view of my improved lid or cover; Fig. 2, a vertical sectional view illustrating the lid or cover applied to a frying-pan.

In carrying out my invention, I provide a lid or cover which is made in sections which are adapted to be readily fitted together when in use, and to be readily taken apart for the purpose of cleaning the same.

1 indicates one of the sections of the improved lid or cover, which section is of annular shape adapted to fit upon a frying pan 2, said section having the horizontal flange portion 3, and the depressed portion forming a groove or gutter 4.

The upper face of the section 1 is provided at opposite sides with horizontally arranged ears 5 for a purpose presently described.

When the section 1 is fitted upon the pan, the shoulder formed by the depressed gutter or groove lies against the inner edge of the pan and prevents slipping off of the section.

6 indicates another section of the lid or cover which section is adapted to fit upon the section 1 with its lower edge within the groove 4. Said section 6 is made of a cone-shape and provided at its apex with an opening 7, and said section is provided upon its exterior near its lower edge with horizontal ears 8 which are adapted to engage beneath the ears 5 whereby to lock the sections 1 and 6 together.

By turning the section 6 in one direction the ears 5 and 8 will be caused to engage, and by turning the section 6 in the opposite direction, said ears will be disengaged and the said section separated.

The section 6 is also provided upon its exterior with a pipe or conduit 9 the upper end of which terminates in proximity to the opening 7, while its lower end terminates at a point adjacent to the rim of section 1 when the sections are fitted together.

10 indicates the remaining section of the lid or cover said section being cylindrical and adapted to fit upon the section 6 to close the opening 7 therein and being provided with a suitable handle 11 for removing said section 10 and replacing it in position. The section 6 is also provided with a suitable handle 12 for removing and replacing said section.

The operation of my device may be briefly described as follows: If meat is to be fried in the pan 2, the same is placed therein and the sections of the cover placed in position as represented in Fig. 2. The steam and grease arising from the meat strike against the cone shaped section 6 and condense, and run down the inner surface into the gutter or groove 4, while such steam, &c., as are not condensed strike against the section 10 and eventually condensing run down the pipe 9 and thence into the channel 4. If it be desired to add water to the contents of the pan, as for instance in stewing, the section 10 may be readily removed and the necessary water poured through the opening 7 after which the section 10 is replaced.

By means of my lid or cover, meat may be quickly fried without any tendency to boil which is the case when ordinary covers are used, and said meat will be found to be richly browned. Furthermore, by the use of my lid or cover, the spattering of grease and water over the stove is prevented and likewise the commingling of smoke and steam with the atmosphere.

The advantages of my invention will be readily seen and appreciated from the foregoing description when taken in connection with the accompanying drawings.

Having thus described my invention, what I claim, and desire to secure by Letters Patent, is—

The herein described lid or cover comprising the section 1, having a horizontal rim 3, and a groove or gutter 4, a cone shaped section 6 having its lower edge removably seated within said groove, and having an opening 7 at its apex, a pipe or conduit 9 upon the outside of said section 6, a section 10 adapted to detachably fit upon the section 6 over the opening 7, and also over the upper end of pipe 9, the lower end of the pipe terminating adjacent to the rim 3 and adapted to conduct water of condensation from the interior of section 10 into the groove 4, horizontal ears 5 upon the upper face of the rim 3 and horizontal ears 8 upon the exterior of section 6 near its lower edge and adapted to removably engage beneath the ears 5, for the purpose specified.

In testimony whereof I affix my signature in presence of two witnesses.

JOHN E. EPP.

Witnesses:
   E. J. CONNELLY,
   WM. C. BARBOUR.